O. EICK.
PASTEURIZING APPARATUS.
APPLICATION FILED DEC. 16, 1908.
1,001,517.
Patented Aug. 22, 1911.
5 SHEETS—SHEET 1.
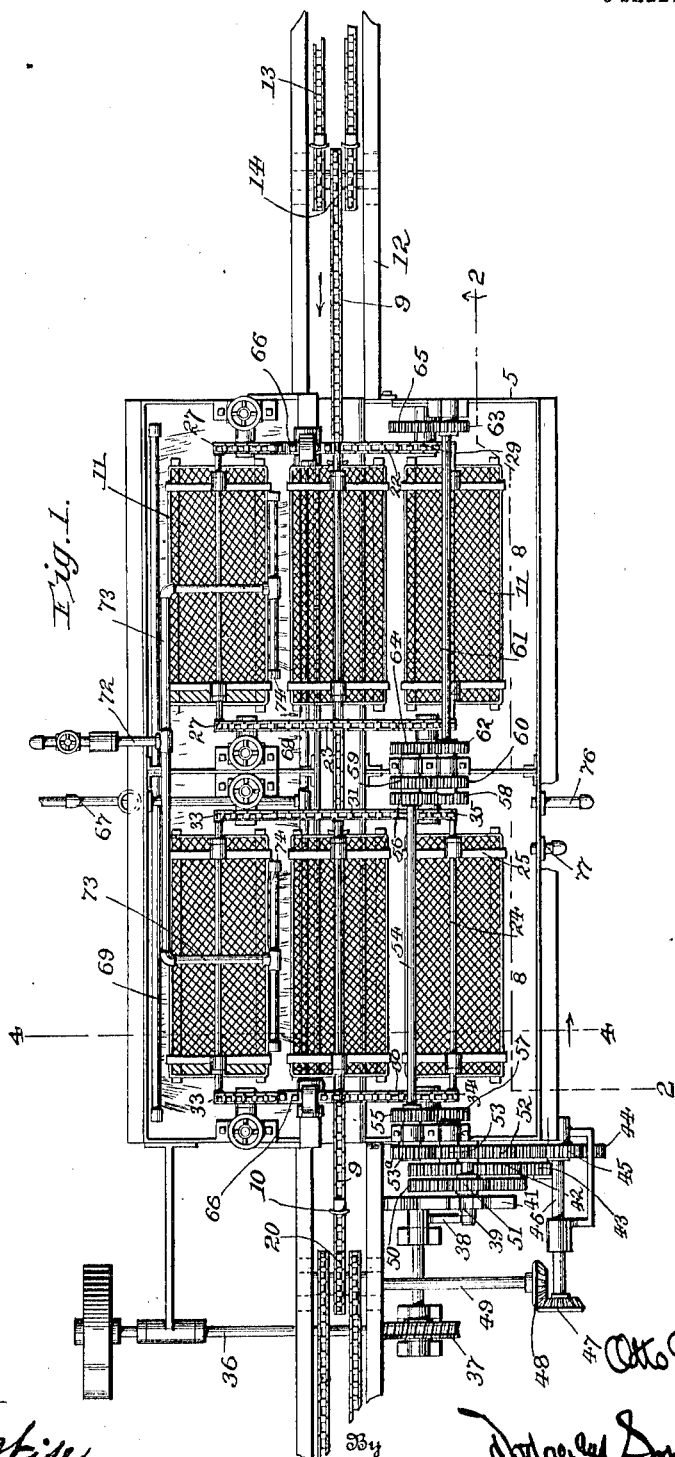

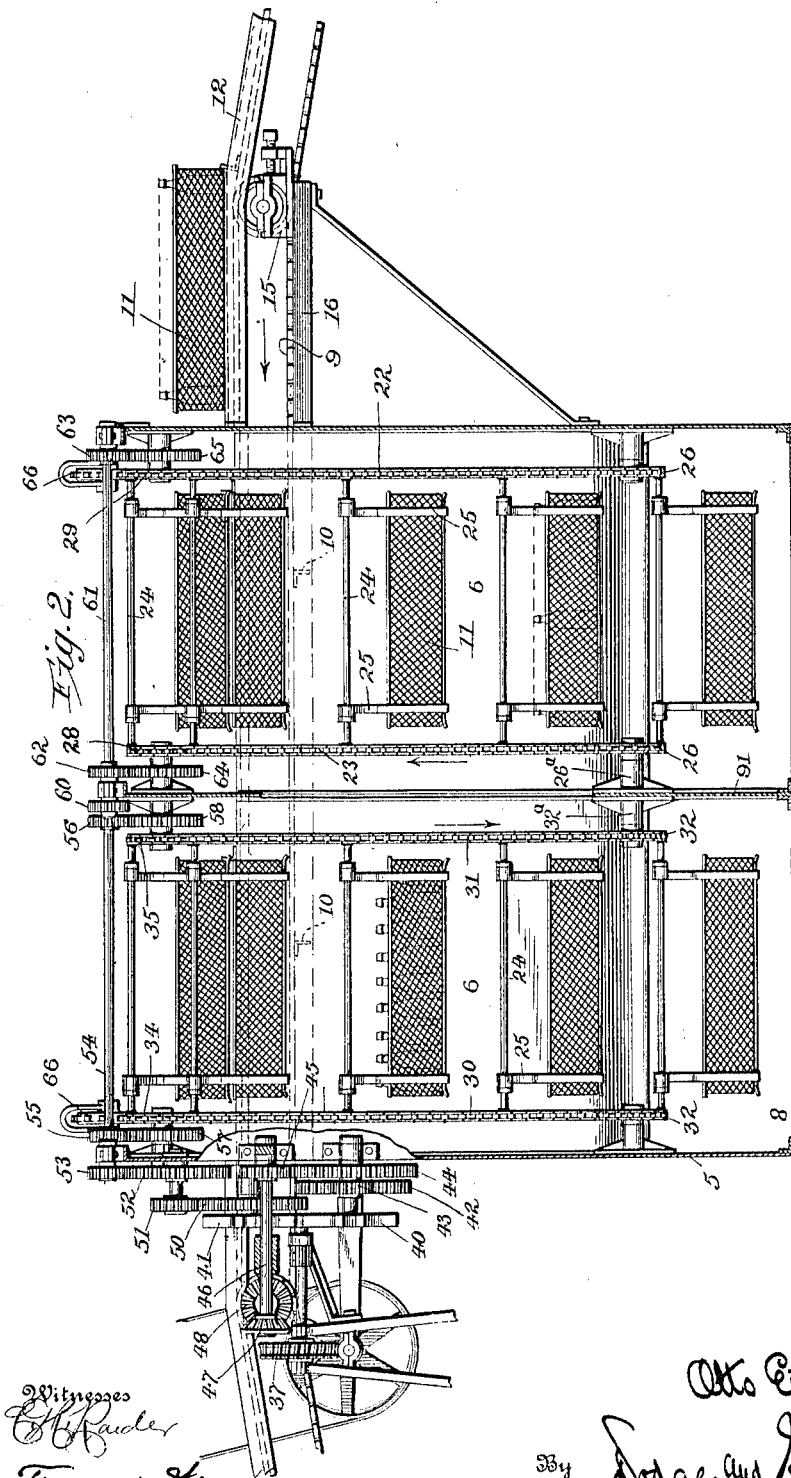

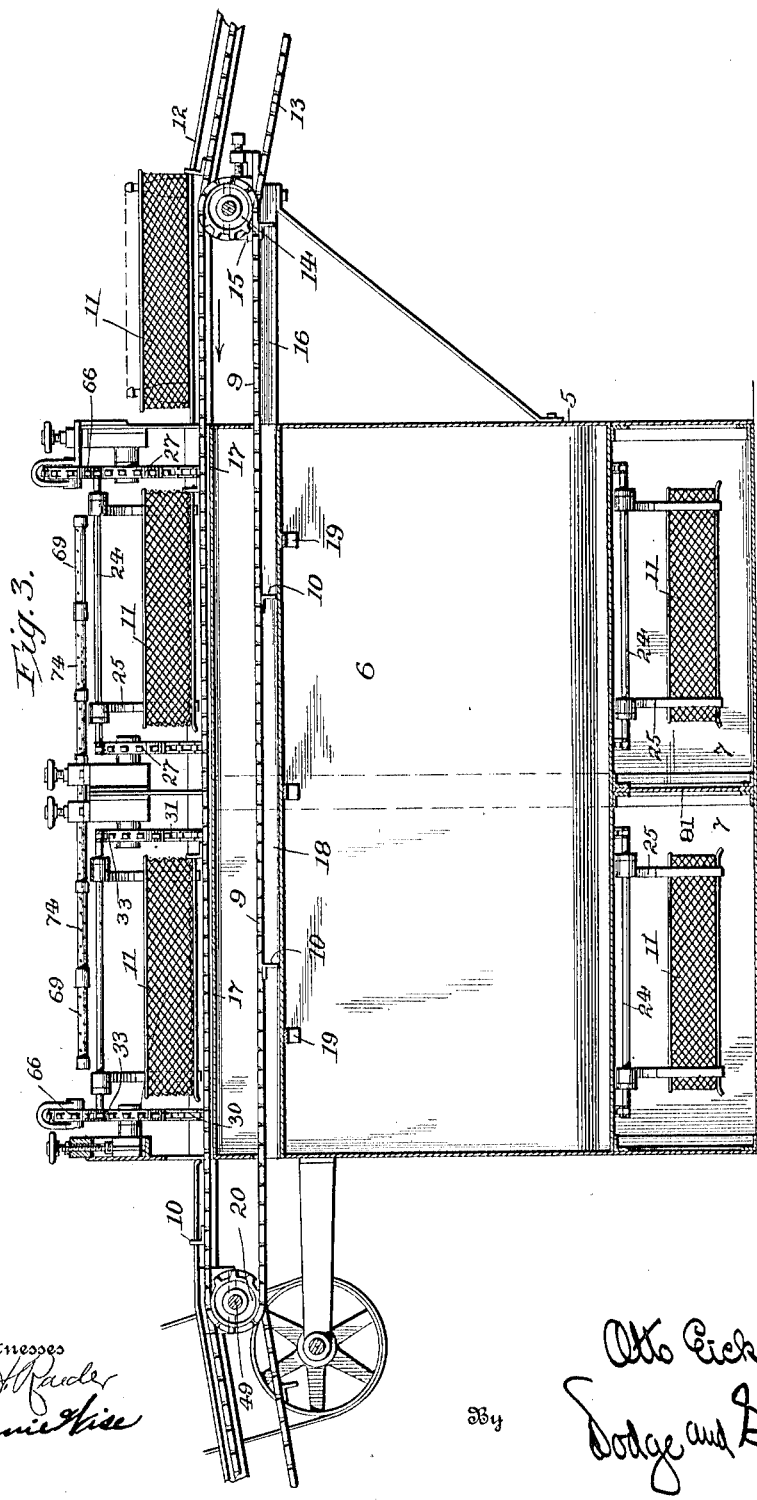

O. EICK.
PASTEURIZING APPARATUS.
APPLICATION FILED DEC. 16, 1908.
1,001,517.
Patented Aug. 22, 1911.
5 SHEETS—SHEET 4.
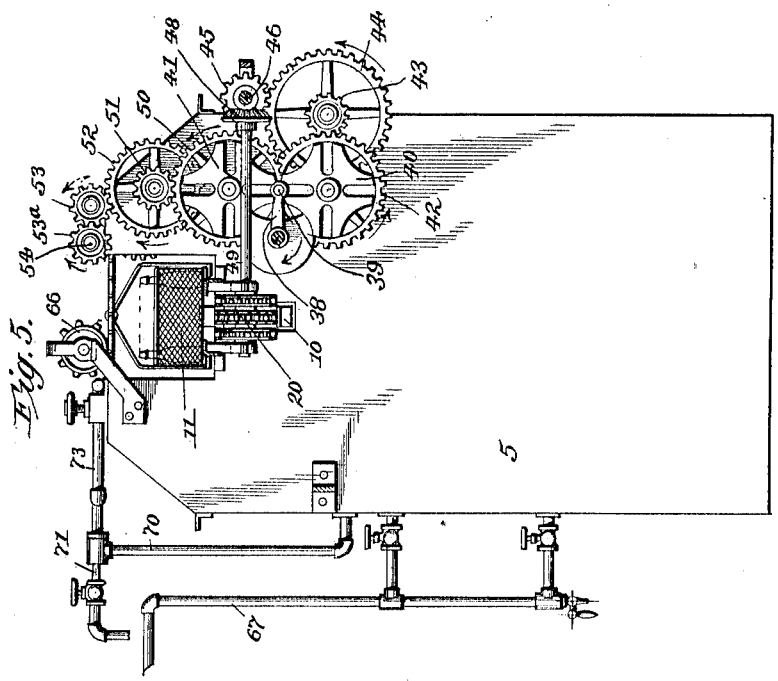
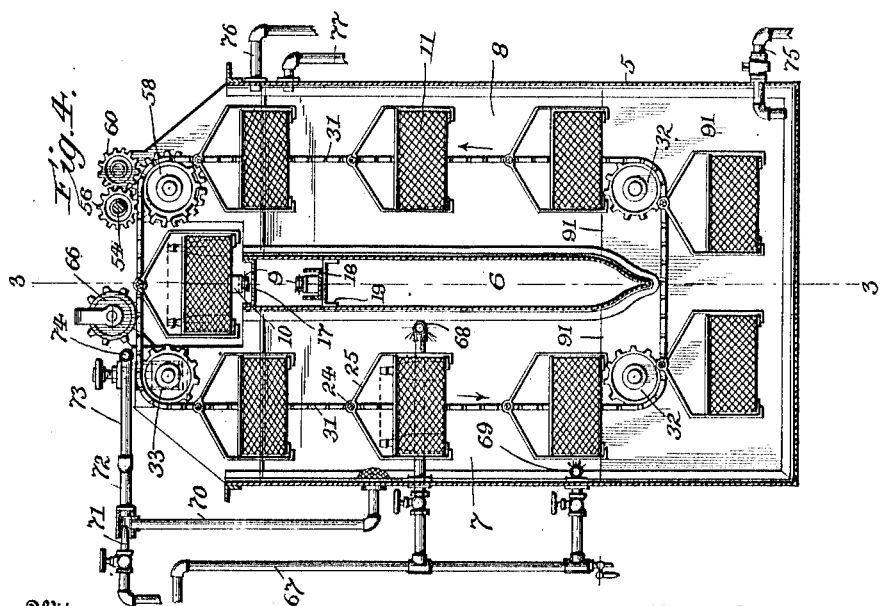

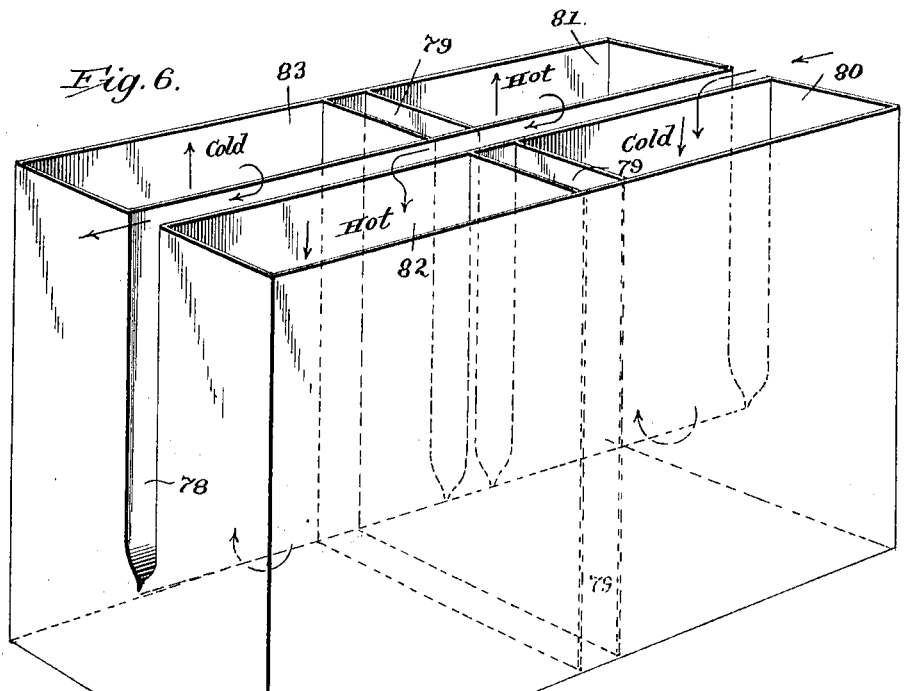
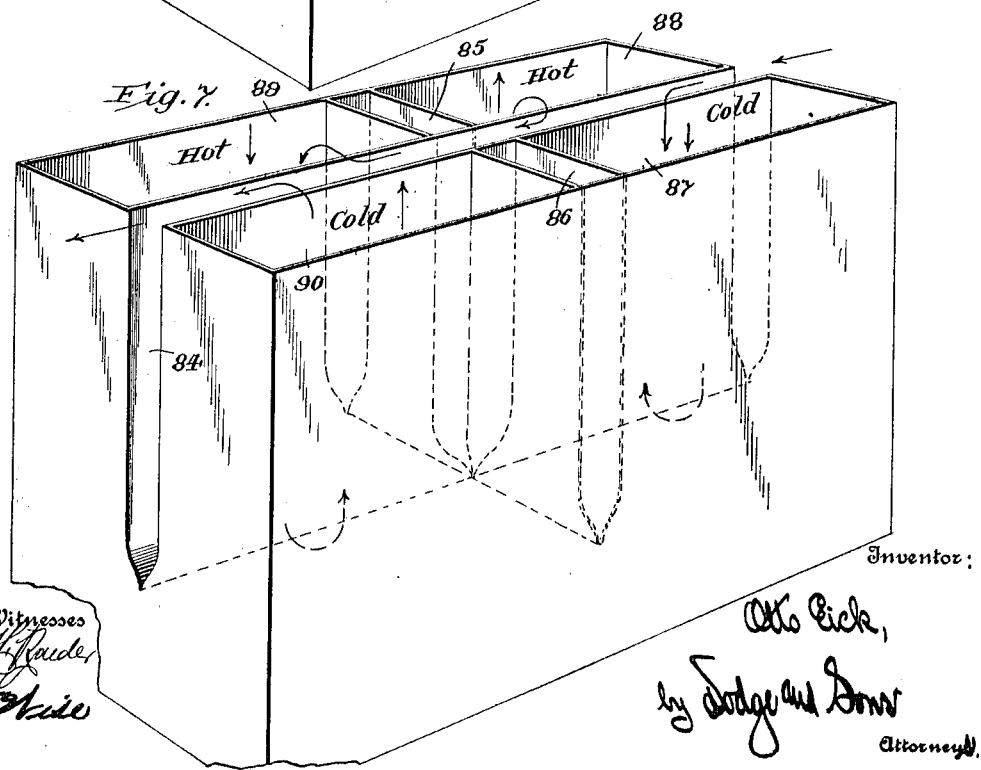

UNITED STATES PATENT OFFICE.

OTTO EICK, OF BALTIMORE, MARYLAND.

PASTEURIZING APPARATUS.

1,001,517.   Specification of Letters Patent.   Patented Aug. 22, 1911.

Application filed December 16, 1908. Serial No. 467,886.

*To all whom it may concern:*

Be it known that I, OTTO EICK, a citizen of the United States, residing at Baltimore, in the State of Maryland, have invented certain new and useful Improvements in Pasteurizing Apparatus, of which the following is a specification.

My present invention pertains to improvements in pasteurizing apparatus, the construction and advantages of which will be hereinafter set forth, reference being had to the annexed drawings, wherein:

Figure 1 is a top plan view of the apparatus; Fig. 2 a vertical longitudinal sectional view, taken on the line 2—2 of Fig. 1; Fig. 3 a similar view, taken on the line 3—3 of Fig. 4; Fig. 4 a transverse vertical sectional view, taken on the line 4—4 of Fig. 1; Fig. 5 an elevation of the discharge end of the apparatus, the main driving shaft and its supporting members being broken away; Figs. 6 and 7, perspective views of the tank, with varying arrangements of partitions, and designed to give different paths of travel to the containers.

The main object of the present invention is to provide a simple and efficient apparatus for pasteurizing material in bottles or other containers, in which relatively few parts are employed, so that the apparatus is not liable to breakage and disarrangement.

A further object of the invention is to provide a construction in which the bottles are first passed down through a body of water which has been slightly heated, and then into a body of warmer or hot water, through which body they are traversed twice the distance they passed through the initial cold or partially warmed water, and finally, after the contents of the bottles have been pasteurized, the bottles are passed through the cold water and thereby gradually restored to their normal temperature. In passing through the cold water, the bottles tend to impart their heat to the water and to bring it to the desired temperature.

The apparatus in a broad sense may be said to consist of a single tank, divided into two compartments, one containing hot water and the second cooler water, said compartments communicating with each other at their lower ends, combined with means for first traversing the bottles down through the cold water compartment, thence upward through the hot water compartment, thence downward through the hot water compartment, and finally up through the cold water compartment to the point of discharge. The construction of the apparatus is such that all parts are readily accessible, and the use of long chains, so common in modern pasteurizing apparatus, is rendered unnecessary, relatively short chains or belts being employed in their stead.

In the drawings, 5 denotes the tank, preferably oblong in form and provided with a central hollow partition 6, which as will be seen upon reference to Fig. 4, extends from the upper portion of the tank to a point short of the bottom thereof, so as to divide the tank into two compartments, designated by 7 and 8, 7 denoting the hot water compartment and 8 the cold or warm water compartment.

An endless chain or carrier 9, provided with a series of push-plates or lugs 10 extends throughout the length of the tank and beyond the ends thereof, as clearly seen in Fig. 1, the upper stretch of the chain standing slightly above the upper edge of the tank, see Fig. 4, so that the lugs or push plates 10 may come into contact with the lower portion of baskets or crates 11, which are primarily placed upon a way 12, located at the forward or in-feed end of the tank.

Any suitable means may be employed for placing the baskets in position upon the way, an endless chain 13 being shown for the purpose of illustration.

The chain 9 passes around an idler 14 at the intake end of the apparatus, which idler is mounted upon a shaft carried in bearings 15 adjustably connected to a bracket 16, Figs. 2 and 3. The upper stretch of the chain is supported upon a cross plate 17 (see Figs. 3 and 4) secured in the upper portion of the hollow partition 6, while the lower stretch runs in a trough or channel 18, mounted upon suitable cross pieces or brackets 19 secured to the inner walls of the partition. At the discharge end of the machine the chain 9 passes about a sprocket 20 mounted upon a shaft to which motion is imparted through suitable gearing, as will be hereinafter set forth.

A pair of chains 22, 23, connected to each other by a series of cross-bars 24 from which are suspended open-ended basket-carrying frames 25, pass about idlers 26 located near the bottom of the tank, so that the lower stretch of the chains passes beneath the lower portion of the hollow partition 6. Said chains likewise pass over idlers 27, located in the upper portion of the tank, and about sprocket-wheels 28, 29, see Fig. 1. A second pair of chains, 30 and 31, provided with cross-bars and depending basket-carrying frames, the same as the other chains, pass about idlers 32, located adjacent to the bottom of the tank, so that the lower stretch of the chain will pass beneath the hollow partition 6, the same as the other chains, the chains also passing over idlers 33 located in the upper portion of the tank and over driven sprockets 34 and 35.

As will be seen upon reference to Figs. 2 and 4, the sprockets 26 and 32 are, respectively, carried by brackets 26ª and 32ª secured to a cross plate 91, said plate extending across the bottom of the tank and upwardly to a point slightly above the lower end of the partition to which it is secured. This plate serves merely as a supporting plate and leaves the compartments 7 and 8 substantially free throughout their length.

Mechanism is provided to drive one carrier, composed of chains, bars and baskets, and the other carrier composed of the other chains, bars and baskets, in opposite directions (in all the forms except the modified form illustrated in Fig. 6); that is to say, the forward carrier, or that at the in-take end, will pass downwardly into the cold-water compartment, thence beneath the partition up through the hot-water compartment, while the other carrier passes down through the hot-water compartment and up through the cold-water compartment. This driving mechanism acts intermittently, and while the carriers are at rest the chain 9 comes into action and serves to transfer one crate or basket from the first carrier to the second carrier, and to remove a crate from the second carrier to the point of discharge, a new crate likewise being introduced into the first carrier. It will thus be seen that after a basket or crate has been traversed by the first carrier through the cold-water compartment, thence upward through the hot-water compartment, it is transferred to the second carrier and moved downwardly through the hot water compartment and finally up through the cold-water compartment, when it is discharged from the machine. To effect this operation, the gearing shown, or its equivalent, may be employed.

36 designates the driving shaft, carrying a worm which meshes with a worm-wheel 37, upon whose shaft is mounted an arm 38 carrying an inwardly-projecting stud or roller 39, which coacts with the Geneva stops 40 and 41, acting alternately upon said stops. The lower member 40 imparts motion to a gear 42, which meshing with a pinion 43 imparts rotation to a gear 44 which in turn imparts motion to a pinion 45, carried upon a shaft 46. Said shaft has secured to its opposite end a bevel gear 47 which meshing with a corresponding gear 48 imparts motion to a shaft 49, upon which the sprocket 20, hereinbefore referred to, is secured. This gearing, as will be seen, will impart an intermittent step-by-step motion to the feed chain or conveyer 9. While it is in operation the Geneva stop 41 is at rest. Said stop 41 has secured to it a gear 50, which meshes with a pinion 51, mounted upon an axle with a gear 52, said gear 52 in turn meshing with a pinion 53 secured to a stub-axle. Said pinion 53 meshes with a pinion 53ª, mounted upon a shaft 54, which shaft carries pinions 55 and 56, which are in mesh, respectively, with gears 57 and 58 secured to stub-axles which carry the sprockets 34 and 35, thus imparting motion to the sprockets and consequently to the chains or carriers which pass over the sprockets. The shaft 54 has likewise secured to it a pinion 59 which meshes with a pinion 60 mounted upon a shaft 61, which shaft carries pinions 62 and 63, which mesh, respectively, with gears 64 and 65, which latter gears are secured to the stub-axles upon which the driving sprockets 28 and 29 are mounted. This arrangement of gearing will cause one of the carriers to move in a direction the reverse of the other. It is to be noted, however, that any suitable gearing for effecting this purpose may be used.

An idler 66 will preferably be located over the chain 22, in order that the frame 25 which is then uppermost may be held in its proper position before the introduction of a basket or crate into the same.

A steam pipe 67 will preferably be located at one side of the tank, adjacent to the outer face of the compartment 7, and spray pipes 68 and 69 will be placed in the tank in line with the frames 25 when they come to rest, or while the carriers are standing still and the chain 9 is being moved to introduce, transfer and discharge the crates. The steam will tend to heat the water and also to throw said hot water directly onto the baskets or crates in which the bottles or other containers are mounted.

A draw-off pipe 70, having its opening into the tank and located at a point below the upper end of the tank works in conjunction with a steam nozzle 71, steam issuing from the nozzle serving to draw the water upward through the pipe and force it through a pipe 72, with branches 73, and spray pipe 74 located above the basket-carrying chains and spray the bottles as they pass downward into the hot-water compartment. All of the water drawn up through the pipe 70 will be more or less heated by the steam jet. A drain pipe 75 is located at the lower portion of the tank, and an overflow pipe 76 will likewise be provided so as to maintain the proper level of water in the tank. A filling pipe 77 will also be employed.

It is possible, and in some cases may be desirable, to subdivide the tank to a greater extent than is indicated in Figs. 1 to 5 inclusive and as set forth in the above description. Thus in Fig. 6 I have shown a tank which is provided with a longitudinal, centrally-disposed partition 78 which extends downwardly toward the bottom of the tank and terminates at a sufficient height therefrom to permit the passage of the conveyer chains and the baskets or crates thereunder. The chambers formed upon each side of this partition are subdivided by a cross-partition 79, which is preferably hollow and extends from the bottom of the tank to the top thereof, as is clearly indicated in the drawings, thus forming four compartments 80, 81, 82 and 83.

The gearing is so arranged that the baskets are carried downwardly by the chains in the direction indicated by the arrow, that is, through compartment 80 which is filled with cold or relatively cold water or other fluid, thence up through the compartment 81 containing hot water, to the advancing mechanism which transfers the basket to the carriers working in the compartment 82 which is filled with hot water, the basket passing down through said compartment, beneath partition 78, and up through compartment 83, which is filled with cool or cold water. At this point it is discharged from the apparatus.

In Fig. 7 the tank is shown as divided by a longitudinal centrally-disposed partition 84 and cross-partitions 85 and 86, said partitions terminating at a point above the bottom of the tank and forming four compartments 87, 88, 89 and 90. The gearing will be so arranged that the carriers will cause the baskets to be traversed in the direction indicated by the arrows, to wit, down through the chamber or compartment 87, up through compartment 88, down through compartment 89, and up through compartment 90, where they will be discharged from the machine.

When cross-partitions are used it is found that the water or other liquid in the several compartments will not intermix to so great an extent as is the case where such partitions are not employed.

Having thus described my invention, what I claim is:

1. In a pasteurizing apparatus, the combination of a tank divided into two compartments which communicate with each other at their lower ends said compartments being adapted to hold a pasteurizing agent; a pair of carriers passing through each of said compartments and moving in opposite directions; and means for transferring the articles to be pasteurized from one carrier to the other.

2. In a pasteurizing apparatus, the combination of a tank divided into two vertically-disposed compartments in open communication at their lower ends, said compartments being adapted to contain a pasteurizing agent, means for passing the articles to be treated downwardly through one compartment and upwardly through the other; means for traversing the articles to be pasteurized through the compartments in a reverse direction; and means for transferring the articles from one traversing means to the other traversing means.

3. In a pasteurizing apparatus, the combination of a tank divided into two vertically-disposed compartments communicating with each other at their lower ends said compartments being adapted to contain a pasteurizing agent; a pair of endless carriers passing through each of said compartments; means for moving said carriers in opposite directions; and means for transferring the articles to be pasteurized from one carrier to the other, whereby the articles will be moved downward and upward through one compartment, and thence downward and upward through the other compartment.

4. In a pasteurizing apparatus, the combination of a tank divided into two vertically-disposed intercommunicating compartments adapted to hold a pasteurizing agent; an endless carrier mounted adjacent to one end of the tank, moving downward through one compartment and upward through the other; a second endless carrier moving through the compartments in a direction opposite to that of the first carrier; and means for transferring the holders for the articles to be pasteurized from one carrier to the other.

5. In a pasteurizing apparatus, the combination of a tank formed with two vertically-disposed compartments communicating with each other at their lower ends and adapted to hold a pasteurizing agent; a pair of endless carriers mounted in said tank and moving through each of the compartments the movement thereof being in opposite directions; means for transferring the crates or holders for the articles to be pasteurized from one carrier to the other; and means for heating the water in one of said compartments.

6. In a pasteurizing apparatus, the combination of a tank formed with two vertically-disposed compartments communicating with each other at their lower ends and adapted to contain a pasteurizing agent; a pair of endless carriers mounted in said tank and moving through each of the compartments and in opposite directions; and means for heating the water in one of said compartments.

7. In a pasteurizing apparatus, the combination of a tank provided with two vertically-disposed compartments communicating with each other at their lower ends and adapted to contain a pasteurizing agent; a pair of endless carriers mounted in the tank and moving through each of the compartments and in opposite directions; means for imparting an intermittent step-by-step motion to said carriers; and means for introducing crates or the like holding the articles to be pasteurized into one carrier and transferring the previously-positioned crate from the first carrier onto the second carrier while the two carriers are at rest.

8. In a pasteurizing apparatus, the combination of a tank provided with two vertically-disposed compartments communicating with each other at their lower ends and adapted to contain a pasteurizing agent; a pair of endless carriers mounted in said tank and passing through each of the compartments and in opposite directions; means for imparting a step-by-step movement to said carriers; a conveyer located at the upper portion of the tank and acting to introduce the article-containing crates or the like into the first carrier, transfer said crates from the first to the second carrier, and discharge the same therefrom; and means for actuating said conveyer while the endless carriers are at rest.

9. In a pasteurizing apparatus, the combination of a tank provided with two vertically-disposed compartments communicating with each other at their lower end and adapted to hold a pasteurizing agent; a pair of endless carriers mounted in said tank and each adapted to pass through both compartments, each of said carriers comprising a pair of endless chains, cross-bars and carrying frames suspended from said cross-bars; means for imparting a step-by-step intermittent rotation to said carriers, one carrier moving in one direction and the other in a direction opposite thereto; a conveyer for introducing crates or like holders for the articles to be pasteurized into the first carrier, transferring the crates previously positioned from said first carrier to the second carrier and discharging the crates from the last-named carrier; and means for imparting motion to said conveyer while the carriers are at rest.

10. In a pasteurizing apparatus, the combination of a tank; a hollow wall or partition extending lengthwise thereof and terminating short of the bottom of the tank, whereby two vertically-disposed compartments will be formed, adapted to contain a pasteurizing agent; means for heating the water in one of said compartments; a pair of endless carriers passing through both of said compartments and beneath the partition; and means for traversing said carriers in opposite directions.

11. In a pasteurizing apparatus, the combination of a tank; a partition extending lengthwise thereof, terminating short of the bottom of the tank, whereby two vertically-disposed compartments will be formed, said compartments being adapted to contain a pasteurizing agent; a cross-partition subdividing the compartments transversely; a pair of endless carriers each passing through both of the compartments, arranged upon opposite sides of said lengthwise-extending partition; means for traversing said carriers; and means for heating the pasteurizing agent in those compartments where a relatively high temperature is to be maintained.

12. In a pasteurizing apparatus, the combination of a tank; a hollow wall or partition extending longitudinally thereof, terminating short of the bottom of the tank and forming longitudinally-disposed compartments; a cross-partition or partitions dividing the longitudinally-disposed compartments into a series of shorter compartments, each of said compartments being adapted to contain a pasteurizing agent; an endless carrier working in each of said pairs of compartments which are oppositely disposed to each other; means for traversing said carriers; and means for heating the pasteurizing agent in those compartments where a relatively high temperature is to be maintained.

13. In a pasteurizing apparatus, the combination of a tank; a hollow partition extending downwardly into the tank; a second hollow partition likewise extending downwardly into the tank, said partitions being arranged crosswise with relation to each other and subdividing the tank into a series of compartments intercommunicating with each other below the partitions, said compartments being adapted to contain a pasteurizing agent; and means for traversing the bottles or like containers which are to be pasteurized through the various compartments.

14. In a pasteurizing apparatus, the combination of a tank; a plurality of hollow partitions extending downwardly into said tank, said partitions being arranged crosswise with relation to each other and to the tank thereby forming a series of compartments separated from each other by airspaces or chambers said compartments being arranged to contain a pasteurizing agent; endless carriers passing through said compartments; and means attached to said carriers for holding a basket or like support for bottles or similar containers which are to be pasteurized.

15. In a pasteurizing apparatus, the combination of a tank provided with a plurality of intercommunicating liquid-containing compartments; a plurality of endless carriers, each carrier extending through at least two of such compartments; and means for transferring the containers for the material being treated from one carrier to the next, whereby relatively short carriers may be employed and easy access had to the various portions of the apparatus.

In testimony whereof I have signed my name to this specification in the presence of two subscribing witnesses.

OTTO EICK.

Witnesses:
G. W. ARMBRUSTER,
C. C. SAMPSON.

Copies of this patent may be obtained for five cents each, by addressing the "Commissioner of Patents, Washington, D. C."